Patented Dec. 26, 1950

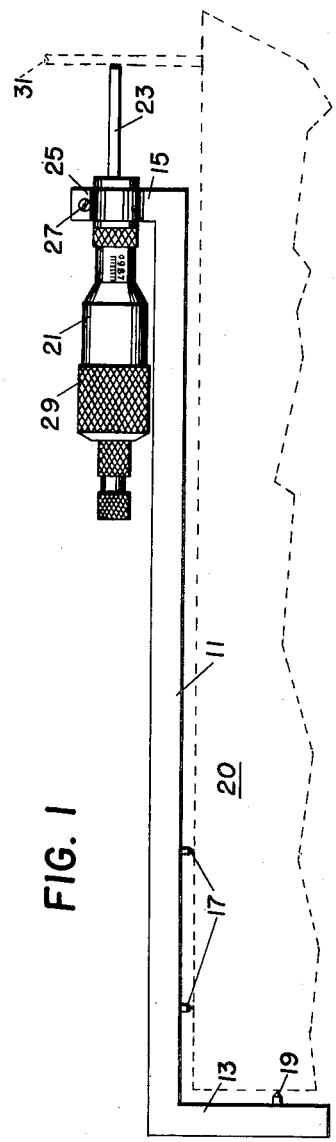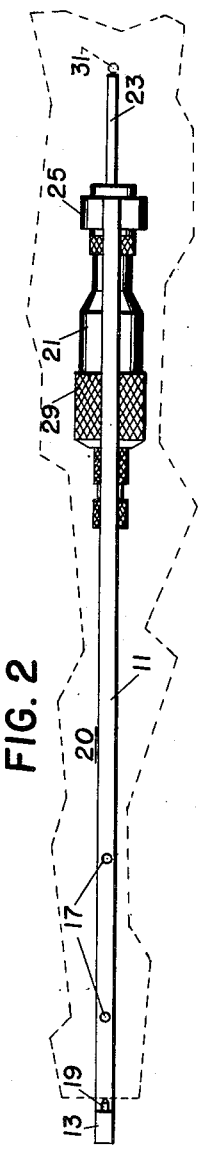

2,535,051

UNITED STATES PATENT OFFICE 2,535,051

ADJUSTABLE CENTERING GAUGE

John F. Donohue, Philadelphia, Pa.

Application November 7, 1946, Serial No. 708,367

6 Claims. (Cl. 33—180)

(Granted under the act of March 3, 1883, as amended April 30, 1928; 370 O. G. 757)

This invention relates to improvements in centering gauges; and objects of the improvement are first, to provide a centering gauge of simple and durable construction adapted to center a wire to the face of a shaft or coupling; second, to provide a centering gauge adapted to measure the radius of the face of a shaft or coupling; third, to provide a centering gauge of the character described that can be employed in the measurement of a wide range of radii, and fourth, to provide a centering gauge of the character described having a plurality of interchangeable measuring scales.

Further objects and advantages of this invention, as well as its construction, arrangement and operation, will be apparent from the following description and claims in connection with the accompanying drawing, which Fig. 1 is an elevation of a centering gauge showing the preferred embodiment of my invention; and Fig. 2 is a side view thereof.

Similar numerals refer to similar parts throughout the several views.

The frame of the centering gauge is a bar comprising a straight-edge body portion 11, a leg portion 13 at an angle to said straight-edge body portion, and another leg portion 15 at an angle to said straight-edge body portion. Preferably, leg portions 13 and 15 extend from the elongate body portion 11 perpendicularly at each end, in the same plane but in opposite directions. Spaced bearing or contact points 17 on an edge of said straight-edge body portion and a bearing or contact point 19 on the abutting edge of the leg portion 13 are so disposed as to permit simultaneous contact of the contact point 19 with the periphery of the shaft or coupling 20 and contact of the contact points 17 with the face of said shaft or coupling 20 and contact of the contact points 17 with the face of said shaft or coupling.

A micrometer 21 having spindle 23 is secured removably to the leg portion 15 by clamp 25 and lock nut 27, the spindle 23 being extensible parallel to the line of the crests of the contact points 17.

When the centering gauge is placed upon the shaft or coupling, the contact points 17 contact the face of said shaft or said coupling and the contact point 19 contacts the periphery of said shaft or coupling. By rotation of the micrometer thimble 29, the end of the spindle is advanced to contact with a wire 31 theretofore secured to the estimated center of the face of a shaft or coupling at a right angle to said face. Comparison of the reading of the micrometer with similar readings taken on a plurality of radii permits movement of the wire to the true center of the face of the shaft or coupling.

It is apparent that accurate determination of the true center can be made despite irregularities in the face surface of the shaft or coupling by virtue of the employment of the spaced contact points on the straight-edge body portion of the centering gauge and that the centering gauge can be employed to determine the true center of the face of a tapered shaft or coupling by virtue of the employment of a single contact point 19 on the leg portion 13. It is further apparent that the centering gauge can be used to measure a wide range of radii by employing one of a plurality of spindles of varying lengths, or by employing one of a plurality of micrometers having spindles of varying lengths.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A centering gauge comprising a bar having a body portion, a plurality of contact points lying in a common plane on an elge of said body portion, and first and second leg portions extending oppositely from opposite ends of said body portion, said first leg portion extending at an angle from said edge and said second leg portion mounting a micrometer scale that is extensible beyond and parallel to said body portion.

2. A centering gauge comprising a bar having a body portion, a plurality of contact points lying in a common plane on an edge of said body portion, and first and second leg portions extending oppositely from opposite ends of said body portion, said first leg portion carrying a contact point on the edge thereof adjacent and facing said edge of said body portion and extending at an angle from said edge and said second leg portion mounting a micrometer scale that is extensible beyond and parallel to said body portion.

3. A centering gauge comprising a bar having a body portion, a plurality of contact points lying in a common plane on an edge of said body portion, and first and second leg portions extending oppositely from opposite ends of said body portion, said first leg portion carrying a contact point on the edge thereof adjacent and facing said edge of said body portion and extending at an angle from said edge, said second leg portion carrying a clamp mounting a micrometer scale, said scale having a removable spindle lying parallel to and being extensible beyond said body portion.

4. A centering gauge comprising a bar having a body portion, a plurality of contact points lying in a common plane on an edge of said body portion, and first and second leg portions extending oppositely from opposite ends of said body portion, said first leg portion extending perpendicularly from said edge and said second leg portion mounting a micrometer scale that is extensible beyond and parallel to said body portion.

5. A centering gauge comprising a bar having a body portion, a plurality of contact points lying in a common plane on an edge of said body portion, and first and second leg portions extending oppositely from opposite ends of said body portion, said first leg portion carrying a contact point on the edge thereof adjacent and facing said edge of said body portion and extending perpendicularly from said edge and said second leg portion mounting a micrometer scale that is extensible beyond and parallel to said body portion.

6. A centering gauge comprising a bar having a body portion, a plurality of contact points lying in a common plane on an edge of said body portion, and first and second leg portions extending oppositely from opposite ends of said body portion, said first leg portion carrying a contact point on the edge thereof adjacent and facing said edge of said body portion and extending perpendicularly from said edge, said second leg portion carrying a clamp mounting a micrometer scale, said scale having a removable spindle lying parallel to and being extensible beyond said body portion.

JOHN F. DONOHUE.

REFERENCES CITED

The following references are of record in the file of this patent:

UNITED STATES PATENTS

| Number | Name | Date |
| --- | --- | --- |
| 264,253 | Davis | Sept. 12, 1882 |
| 390,789 | Little | Oct. 9, 1888 |
| 435,089 | Le Francois | Aug. 26, 1890 |
| 1,887,437 | Schotthoefer | Nov. 8, 1932 |
| 1,949,280 | Lester | Feb. 27, 1934 |